Patented Feb. 13, 1934

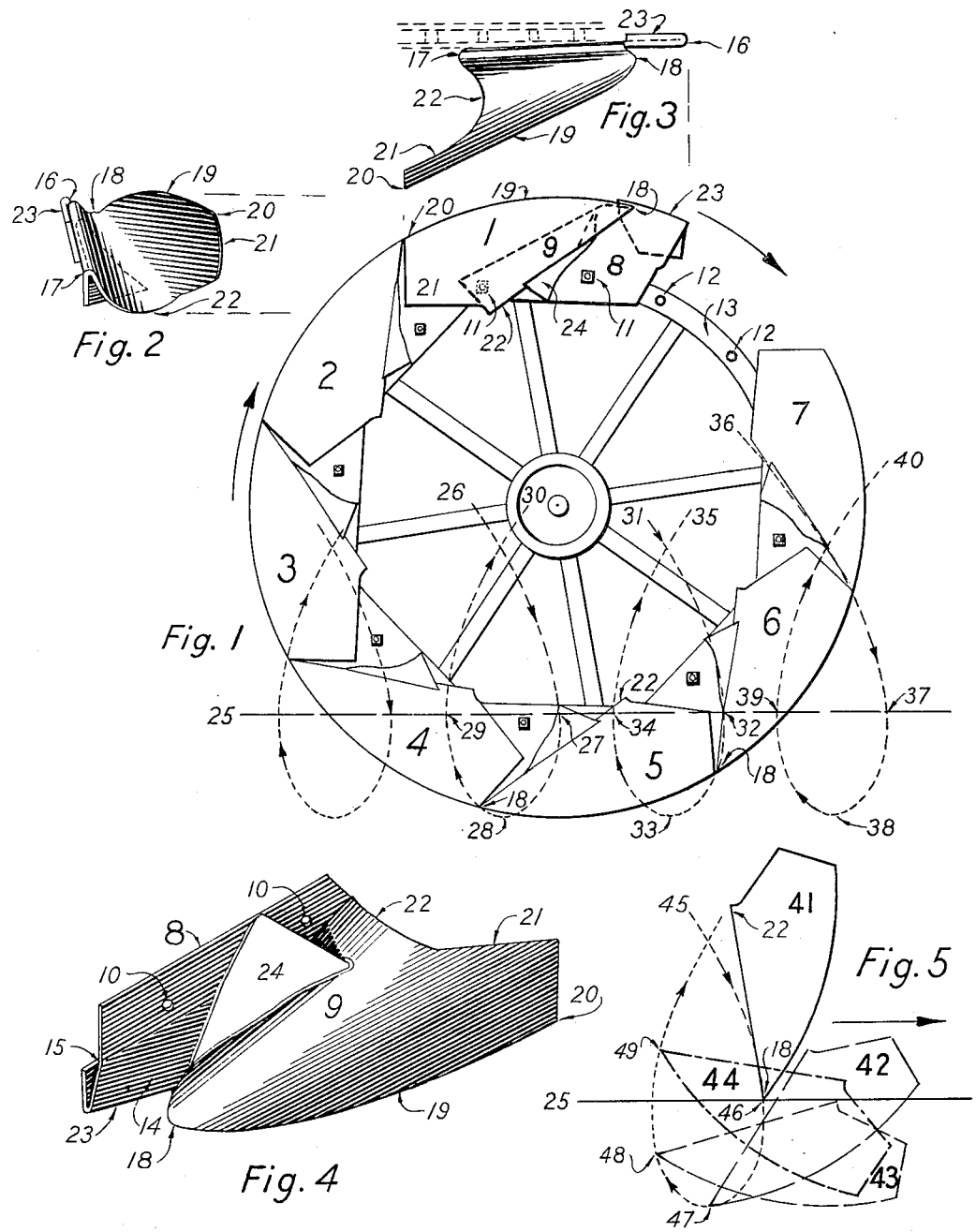

1,947,261

UNITED STATES PATENT OFFICE 1,947,261

WHEEL

Charles P. Hartley, Washington, D. C., dedicated to the free use of the Public

Application July 14, 1933. Serial No. 680,384

3 Claims. (Cl. 97—212)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of the patent to me.

My invention relates particularly to new and hitherto unused improvements in driving wheels used for tractive purposes on agricultural implements and machinery in connection with soil tilling, harrowing, cultivating and in crop gathering and harvesting operations, and the like.

Driving wheels hitherto employed on agricultural implements have been designed to roll upon and be supported by the surface of the soil over which they travel with the result that the surface of the soil over which such driving wheels pass is compacted and forced below the level of the surrounding soil by the weight of the implement on which the wheels are mounted and, unless immediately thereafter thoroughly broken up and pulverized are left exposed to contact with the air and in a hard packed condition favorable to rapid evaporation of soil moisture with a resultant tendency to the formation of dense hard clods, impenetrable to precipitation, difficult to break up and quite unfit for utilization in crop production. The constantly increasing size and weight of agricultural machines of all various types employing such driving wheels has intensified the difficulty described, by necessitating, in order to support the greater weights of the machines without undue concentration of pressure on the soil surface, wider wheel faces with a corresponding increase in the proportionate part of the soil surface undesirably compacted and hardened by such wider wheel faces.

Driving wheels of this type in operating on arable soils frequently fails to provide the degree of traction required for drawing large heavy implements or those used in the heavier soil tilling operations, such as plowing and the like. Attachments of various forms adapted to dig into the soil and improve the traction of the wheels, are very commonly employed on driving wheels of tractors, bull wheels of combines and other harvesting machinery. Attachments hitherto employed for this purpose have been of many forms usually, lugs, spuds, or cleats, but have in general the common characteristic that they project radially from the wheel rim and are relatively short, in comparison with the diameter of the wheel and therefore, in their movement in entering and leaving the soil, describe either common cycloid curves or curtate cycloids so closely approaching the common cycloid in form, that their action is simply to form depressions or indentations in the soil track made by the wheels.

The tractive action of such lugs or cleats against the soil serves to further compress and pack portions of soil already more or less compacted by the pressure of the wheel rims. With soils of many types and under some conditions of soil moisture content, this further packing results in the adhesion of the soil so compacted to the face of the lug and the consequent gradual filling with soil of the spaces between the lugs and the lugs become ineffective in increasing traction unless the soil adhering to them is frequently removed.

Driving wheels of conventional type also frequently fail to provide sufficient resistance against side slipping, especially when used on tractors operating on side hills, terraces, and hilly land and in the construction of terraces and similar operations.

My invention, hereinafter more fully described, overcomes the objections recited above, and provides a driving wheel, which combines greatly increased traction with soil-tilling ability. I attain these important advantages broadly by means of a narrow tired driving wheel carrying peripheral, pointed, acutely tapering, soil penetrating members which, by the driving action of the wheels, are forced, pointed end first, into the soil and, by a wedging action, displace portions of the soil sidewardly, upwardly, and rearwardly with respect to the direction of movement of the wheel along the ground. Soil portions so displaced are left in a loosened state and are not rolled down or compacted in any manner by the driving wheel but are displaced in such a manner as to permit portions of the soil penetrating members, which are adapted to support weight, to be carried down into the soil and to contact with it below the surface of the surrounding soil. The soil portions compressed by the pressure upon them of the weight supporting surfaces of the soil penetrating members, are not left exposed to the air but are broken up by the action of the succeeding soil penetrating members and are also covered with loose earth by the action of the rear portions of the soil penetrating members as the latter are lifted from the soil by the further rotation of the driving wheel.

My invention has a further advantage in that it may be attached to narrow rimmed wheels, as the weight carried by the wheel is not borne by the rim but by my device.

My invention is illustrated in the accompanying drawing, forming part of this application, in which:

Fig. 1 is a side view of a driving wheel embodying my invention.

Fig. 2 is a view of one of the soil tilling members as viewed from the broader or rearward end.

Fig. 3 is a view of one of the soil tilling members as viewed from the outer side, that is, looking radially inward.

Fig. 4 is a perspective view of a soil tilling member looking obliquely forward and downward upon it, with the member in the position in which it is in full contact with the soil.

Fig. 5 is a view of a soil tilling member in a series of positions, showing the progressive movement of the same in the soil.

Similar numerals refer to similar parts throughout the several views.

Referring to Fig. 1, this shows a driving wheel equipped with seven exactly similar soil tilling members, 1, 2, 3, 4, 5, 6 and 7, and having a space for an eighth member (not shown), the wheel being shown with one member removed in order to show, with greater clearness, the relation of the soil tilling members, to the wheel rim, and the extent to which the soil tilling members extend outward beyond the wheel rim.

I prefer eight soil tilling members, but my invention may be practiced with a lesser or greater number, depending upon varying conditions and circumstances.

The several soil tilling members being exactly similar, the description of soil tilling member 1 which follows, will apply equally to each of the other members.

Each soil tilling member comprises two distinct major portions, a flat, or nearly flat, segmental plate 8, and a pointed, tapering approximately semi-conoidal portion 9. Plate 8 is provided with holes 10 adapted to receive bolts 11 extending through bolt holes 12 in wheel rim 13, the plate 8 being thereby secured against the side of wheel rim 13. The outer portion 14 of plate 8 may be bent inward to form a crook 15 (Fig. 4) so as to overhang the rim 13 of the wheel (Fig. 1). The semi-conoidal member 9 is secured by any suitable means, at one of its longitudinal edges to the outer edge 16, 17, of plate 8 with its concave side facing outwardly and with its smaller end pointing in the direction of normal forward rotation of the driving wheel. The arrow adjacent to the driving wheel (Fig. 1) indicates the direction of forward rotation of the same. The outer, unattached edge 18, 19, 20 of semi-conoidal member 9 is formed in a helix, coaxial with the wheel. The rear portion or wing 21 of member 9 extends rearwardly beyond the over-arching portion 22. Toe 18 of member 9 lies substantially in the plane of wheel rim 13 while heel 20 flares outwardly away from the plane of the wheel and extends circumferentially rearward to a point approximately even with the toe of the next succeeding soil tilling member 2. The forward outer corner or claw 23 of plate 8 is the first portion of the soil tilling member to enter the soil and is reenforced by an increased or additional thickness of metal.

I prefer to reenforce claw 23 by doubling over a portion of plate 8 as shown in Figs. 2, 3, and 4, but is evident that any other method of providing additional thickness of metal at this point as, for example by welding, could be employed, and would serve a similar purpose.

A flat, approximately triangular, strut 24 extends obliquely between plate 8 and the overarching portion 18—22 of semi-conoidal member 9, and is secured by welding, or other suitable means, to each of those members, so as to strengthen and reenforce semi-conoidal member 9 and to increase its ability to support load on the helical outer edge 18—19—20.

The action of a driving wheel embodying my invention is as follows:

On pavement or hard surfaced ground the wheel rolls on claw 23 and helical edge 18, 19, 20 of each of the soil tilling members, in succession. On an even uniform surface the wheel rolls forward smoothly, since the points on which it rolls are all at equal distances from the wheel's axis.

On softer soils outer portions 23, 18, 19 and 20 of the soil tilling members, being presented edgewise to the soil, are forced down into it by the weight of the equipment carried upon the wheel. As the wheel is rotated forwardly by torque exerted through its axle, each of the soil tilling members in succession, is brought into contact with the soil. Claw 23 and toe 18 are the first portions of the soil tilling member to penetrate the soil. As pointed toe 18 of semi-conoidal member 9 is forced into the soil, the diverging surfaces of semi-conoidal member 9 force portions of the soil sideward, upward and rearward with a combined shearing and wedging action. The angle at which semi-conoidal members 9 enter the soil is shown at 6, in Fig. 1 and at 41, in Fig. 5. The broken line 25, in the same figures shows approximately the level of the soil surface in relation to the driving wheel, when the wheel is operating on moderately loose arable soil. The depth to which the wheel sinks in the soil varies according to the nature and conditions of the soil, the weight upon the wheel and the tractive effort exerted by it.

The weight resting on the wheel, tends to force the soil penetrating members vertically downward into the soil. The tractive effort developed by the wheel tends to cause it to slip tangentially. Any momentary tendency to slippage, however, causes semi-conoidal member 9 to be driven more deeply into the soil. The deeper that member 9 is driven into the soil, the greater the amount of soil it displaces, and the greater the resistance offered by the soil. A depth is quickly reached at which the resistance encountered equals the tangential tractive effort necessary to drive the implement on which the wheel is mounted, at which point slippage ceases and the implement moves forward, with the wheel revolving as though rolling on an imaginary rim or rolling circle in contact with and rolling without slip upon a plane somewhat below the surface of the ground. The outer portions 18, 19, 20, and 23 of the soil tilling members, since they are points on radii of the rolling circle produced outside the circumference of the rolling circle, necessarily describe curtate cycloid curves. Since the distance to which these points extend outside of the rolling circle is comparable generally to one half of the radius of the rolling circle, the curtate cycloids described are of a pronounced character. These points therefore enter and leave the soil surface in a vertical or practically vertical direction and have a pronounced rearward movement while buried in the soil and emerge from the soil at a point to the rear of that at which it entered the same. This is illustrated in Fig. 1 by the dotted line 26, 27, 28, 29, 30, which shows the looped portion of the curtate cycloidal path followed by toe 18 of soil-tilling member 5. The small arrows included in the dotted line indicates the direction of movement along the path of toe 18. Similarly, the dotted line 31, 32, 33, 34, 35, shows the path along which toe 18 of soil tilling member 6 is carried by the rolling movement of the wheel, while the path of toe 18 of soil tilling member 7 is shown by the dotted line 36, 37, 38, 39, 40.

Soil tilling member 6 is shown in Fig. 1 with its toe 18 entered a short distance into the earth, following along the path 32—33. Soil tilling member 5, in the same figure has reached a position where it is almost completely buried below the surface 25 of the soil. In this position, the broader, overarching portion 22 of member 5 is contacting with the soil and supporting a portion of the weight carried by the wheel. The soil portion upon which this weight is supported is necessarily compressed and compacted. As member 5 is lifted from the soil by the further rotation of the wheel, toe 18 of member 6 moves upward along the path 33—34, passing directly upward through the rear portion of the soil compacted by portion 22 of member 5, displacing it upward and outward and breaking it up. At the same time, a portion of the soil lifted by the overarching portion 18—22 of member 5 falls back over the broader end 22 upon the soil loosened and broken up by toe 18 of the following member 6, as this toe moves upward along the path 33—34, so that the surface of the soil is left in a loose condition.

The soil stirring and loosening action of a soil tilling member as it is driven into and lifted from the soil by the forward rotation of the driving wheel is shown in Fig. 5 by successive views 41, 42, 43 and 44 of the same member as its toe 18 moves along the loop 45—46—47—48—49 of the curtate cycloidal path. When the soil tilling member is in position 41, shown in a solid unbroken line, the soil tilling member stands with its toe 18 at the surface 25 of the soil and about to penetrate the same. The same soil tilling member is shown in broken line at 42 in the position which it occupies when toe 18 has reached the lowest point 47 of the loop. The short-dash outline 43 shows the position of the same member when its toe 18 has moved up to the point 48 about half way between the lowest position 47 and the soil surface 25, while the dot-dash outline 44 shows the same member again as its toe reaches the point 49 and its overarching portion has been lifted above the soil surface 25.

Referring to Fig. 5, when the soil tilling member is in position 41, where toe 18 enters the soil, it is to be noted that the overarching surface 18—22 is very nearly tangential to the direction in which toe 18 is moving. This relative position is approximately maintained during much of the downward, soil-penetrating movement from point 46 to point 47, but as toe 18 traverses the lower portion of the loop, the angle between the overarching surface and the looped path increases and becomes substantially a right angle as toe 18 moves upward from point 48 to point 49 and rises out of the soil, lifting and pushing aside the soil in contact with it.

Each point along the helical edge 18, 19, 20 of each soil tilling member moves in the soil along looped paths exactly similar to those shown in Figs. 1 and 5 but in separate parallel planes. The heel 20 of each such member, since it lies in the same radial plane as the toe 18 of the next following soil tilling member moves in a looped path, the projection of which in Fig. 1 coincides exactly with that of the path followed by the toe 18 of the following member.

The looped paths traversed by corresponding points of the several soil tilling members lie so close together, as is evidenced by inspection of a series of these looped paths shown by dotted lines in Fig. 1, that the entire surface of the soil path traversed by a driving wheel thus equipped is thoroughly broken up, loosened and stirred and left in a condition of tilth, with no part of such path packed down or compacted.

Although the soil so traversed is thoroughly loosened and stirred, Fig. 1 shows that the paths traversed by corresponding points of succeeding soil tilling members, do not interlace or cross in the soil, but each soil tilling member moves in and through soil not previously traversed nor loosened by the member preceding it. This fact, together with the acutely tapered, semiconoidal form of the soil penetrating member 9 makes this device particularly effective in providing greatly improved traction for a driving wheel embodying my invention, as compared with a driving wheel equipped with radial cleats or lugs of the conventional type.

The greatly increased traction afforded by my invention makes possible the use of tractors or similar equipment on soils of such nature and condition as to entirely preclude the use of conventionally equipped tractors on account of excessive wheel slippage. Driving wheels equipped with my device do not spin in loose soft soils, but merely dig in to such depth as may be necessary to afford the required degree of traction and roll forward without slipping. On very soft soils the wheels may sink to such an extent that one third of the circumference of the driving wheels will be competely lost to view in the soil, but will drive steadily forward.

The depth to which the wheel sinks in the soil is dependent, to a considerable degree on the tractive effort developed. For example, the wheels of a tractor, equipped with my device and drawing a wheeled plow, will sink to only a moderate depth while the plow bottoms are kept raised from the ground, but will sink to a markedly greater depth immediately upon the plow bottoms being lowered into the ground and will promptly climb again to the shallower depth when the plow bottoms are raised from the soil. The depth to which the wheel penetrates the soil is varied automatically by the action of the soil tilling members, in accordance with the tractive effort developed.

Driving wheels embodying my invention in addition to affording greatly increased traction, also afford markedly increased resistance to side slipping in operating on hillsides or other sloping soil surfaces. The considerable area of radially disposed surface presented by the outer edge 18, 19, 20 of member 9, claw 23, and outer edge 16, 17 of plate 8, to contact with the soil and the depth to which these surfaces penetrate the soil, make such wheels peculiarly effective in obviating and preventing any tendency to sideward movement of the wheels in the soil.

Having thus described my invention, I claim:

1. A wheel having soil tilling traction improving members comprising segmental flat plates adapted to be detachably secured to the rim of said driving wheel with their width disposed radially and with their outer edges extending radially outward; means for securing the segmental plates to said driving wheel rim; pointed, acutely tapering, approximately semi-conoidal soil-penetrating members having a length comparable to the radius of said driving wheel, each secured, along one of its longitudinal edges, to the outer edge of a segmental plate, on the outer side of the same, with the concave surface of the semi-conoidal soil penetrating member facing radially outward, with its unattached outer edge of greater length than the attached inner edge and disposed radially to form a helical edge coaxial with and of greater diameter than the driving wheel, with the pointed end of the soil penetrating member disposed substantially in the plane of the driving wheel rim and pointing in the direction of normal forward rotation of said driving wheel and adapted to be forced, by the tractive action of said driving wheel, pointed end first into arable soils traversed by said driving wheel and to displace portions of the soil by an oblique wedging action, sidewardly, upwardly and rearwardly so as to loosen and stir the soil displaced and cause the broader, concave, overarching surfaces of the soil penetrating members to be carried below the surface of the soil to such a depth that the portions of the soil compressed under these surfaces by the weight of the implement upon which the said driving wheel is mounted, will be below the surface of the surrounding soil and will be covered by the loosened soil falling back upon them as the soil penetrating members are lifted from the ground by the further rotation of the driving wheel; and flat, approximately triangular members disposed obliquely between the segmental plates and the soil penetrating members and suitably secured to each of the same, by such means and in such a manner as to form a strut adapted to stiffen and reinforce the soil penetrating member against distortion and to increase its capacity to support weight upon its outer, helical edge.

2. The combination with a wheel of soil tilling traction improving members comprising detachable segmental plates having their width disposed radially and their outer edges extending beyond said driving wheel; means for securing said plates to said driving wheel; pointed, acutely tapering, approximately semi-conoidal soil penetrating members having a length comparable to the radius of said driving wheel, each secured, along one of its longitudinal edges, to the outer edge of a segmental plate, on the outer side of the same, with the concave surface of the semi-conoidal soil penetrating member facing radially outward, with its unattached outer edge of greater length than the attached inner edge and disposed radially to form a helical edge coaxial with and of greater diameter than the driving wheel, with the pointed end of the soil penetrating member disposed substantially in the plane of the driving wheel rim and pointing in the direction of normal forward rotation of said driving wheel and adapted to be forced, by the tractive action of said driving wheel, pointed end first into arable soils traversed by said driving wheel and to displace portions of the soil by an oblique wedging action, sidewardly, upwardly and rearwardly so as to loosen and stir the soil displaced and cause the broader, concave, overarching surfaces of the soil penetrating members to be carried below the surface of the soil to such a depth that the portions of the soil compressed under these surfaces by the weight of the implement upon which the said driving wheel is mounted, will be below the surface of the surrounding soil and will be covered by the loosened soil falling back upon them as the soil penetrating members are lifted from the ground by the further rotation of the driving wheel; and flat, approximately triangular members disposed obliquely between the segmental plates and the soil penetrating members and suitably secured to each of the same, by such means and in such a manner as to form a strut adapted to stiffen and reinforce the soil penetrating member against distortion and to increase its capacity to support weight upon its outer, helical edge.

3. The combination with a driving wheel of soil tilling traction improving members comprising detachable segmental plates having their width disposed radially and their outer edges extending beyond said driving wheel; means for securing said plates to said driving wheel; pointed, acutely tapering, pyramidal soil penetrating members having a length comparable to the radius of said driving wheel, each secured, along one of its longitudinal edges, to the outer edge of a segmental plate, on the outer side of the same, with the concave surface of the semi-pyramidal soil penetrating member facing radially outward, with its unattached outer edge of greater length than the attached inner edge and disposed radially to form a helical edge coaxial with and of greater diameter than the driving wheel, with the pointed end of the soil penetrating member disposed substantially in the plane of the driving wheel rim and pointing in the direction of normal forward rotation of said driving wheel and adapted to be forced, by the tractive action of said driving wheel, pointed end first into arable soils traversed by said driving wheel and to displace portions of the soil by an oblique wedging action, sidewardly, upwardly and rearwardly so as to loosen and stir the soil displaced and cause the broader, concave, overarching surfaces of the soil penetrating members to be carried below the surface of the soil to such a depth that the portions of the soil compressed under these surfaces by the weight of the implement upon which the said driving wheel is mounted, will be below the surface of the surrounding soil and will be covered by the loosened soil falling back upon them as the soil penetrating members are lifted from the ground by the further rotation of the driving wheel; and flat, approximately triangular members disposed obliquely between the segmental plates and the soil penetrating members and suitably secured to each of the same, by such means and in such a manner as to form a strut adapted to stiffen and reinforce the soil penetrating member against distortion and to increase its capacity to support weight upon its outer, helical edge.

CHARLES P. HARTLEY.